(12) United States Patent
Srinivasan et al.

(10) Patent No.: US 10,754,739 B2
(45) Date of Patent: Aug. 25, 2020

(54) SYSTEM AND METHOD FOR PREDICTIVE BACKUP IN A DISTRIBUTED ENVIRONMENT

(71) Applicant: EMC IP Holding Company LLC, Hopkinton, MA (US)

(72) Inventors: Sharath Talkad Srinivasan, Bengaluru (IN); Mahesh Rao, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 36 days.

(21) Appl. No.: 16/172,634

(22) Filed: Oct. 26, 2018

(65) Prior Publication Data

US 2020/0133802 A1    Apr. 30, 2020

(51) Int. Cl.

| | | |
|---|---|---|
| *G06F 11/30* | (2006.01) | |
| *G06F 9/455* | (2018.01) | |
| *G06F 11/14* | (2006.01) | |
| *G06F 11/00* | (2006.01) | |

(52) U.S. Cl.
CPC ...... *G06F 11/1484* (2013.01); *G06F 9/45558* (2013.01); *G06F 11/008* (2013.01); *G06F 11/1461* (2013.01); *G06F 11/1464* (2013.01); *G06F 11/301* (2013.01); *G06F 2009/45562* (2013.01); *G06F 2009/45583* (2013.01); *G06F 2201/81* (2013.01); *G06F 2201/815* (2013.01)

(58) Field of Classification Search
CPC .............................. G06F 11/301; G06F 9/454

USPC ......................................................... 711/162
See application file for complete search history.

(56) References Cited

U.S. PATENT DOCUMENTS

| | | | |
|---|---|---|---|
| 8,209,290 B1* | 6/2012 | Dowers, II | G06F 16/21 |
| | | | 707/640 |
| 9,720,783 B1* | 8/2017 | Kulkarni | G06F 11/1461 |
| 9,740,577 B1* | 8/2017 | Chakraborty | G06F 11/1451 |
| 2016/0132400 A1* | 5/2016 | Pawar | G06F 11/14 |
| | | | 707/679 |
| 2017/0168903 A1* | 6/2017 | Dornemann | G06F 9/45558 |
| 2019/0220369 A1* | 7/2019 | Liu | G06F 11/1464 |
| 2019/0278662 A1* | 9/2019 | Nagrale | G06F 11/1451 |
| 2019/0332263 A1* | 10/2019 | Chopra | G06F 3/0619 |
| 2019/0332410 A1* | 10/2019 | Chopra | G06F 9/45558 |
| 2019/0332496 A1* | 10/2019 | Chopra | G06F 9/45558 |

* cited by examiner

*Primary Examiner* — Christopher B Shin
(74) *Attorney, Agent, or Firm* — Chamberlain, Hrdlicka, White, Williams & Aughtry

(57) ABSTRACT

A production host for hosting virtual machines includes a persistent storage and a production agent. The persistent storage stores virtual machine data of the virtual machines. The production agent obtains a dynamic backup generation rule for the virtual machines; for a predetermined period of time after obtaining the dynamic backup generate rule: generates first backups of the virtual machines based on the dynamic backup generate rule; and identifies a change rate of the virtual machine data; after the predetermined period of time, obtain a prediction-based backup generation rule that is based on the change rate of the virtual machine data over the predetermined period of time; and generates second backups of the virtual machines based on the prediction-based backup generation rule.

9 Claims, 11 Drawing Sheets

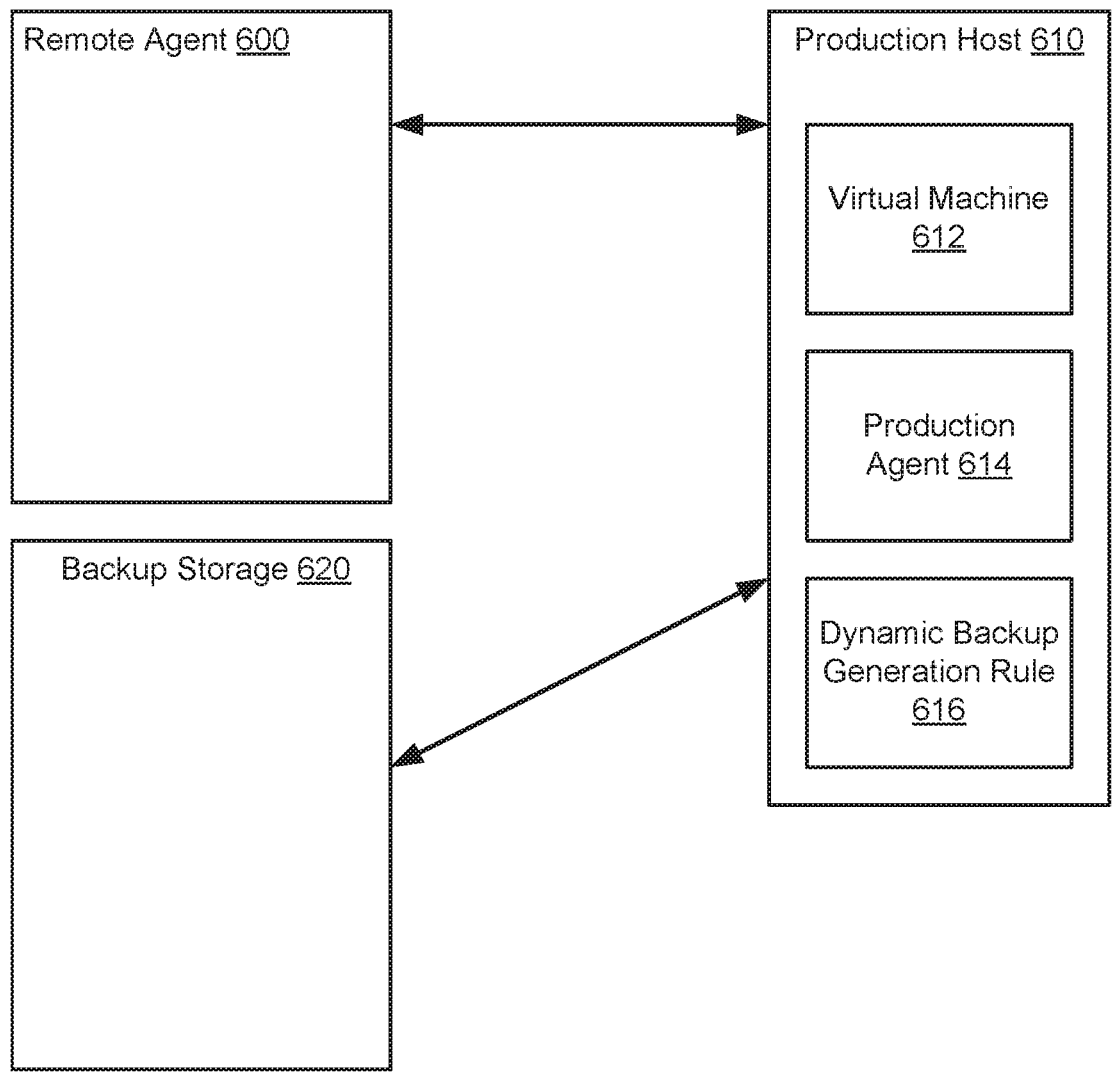
FIG. 6.1

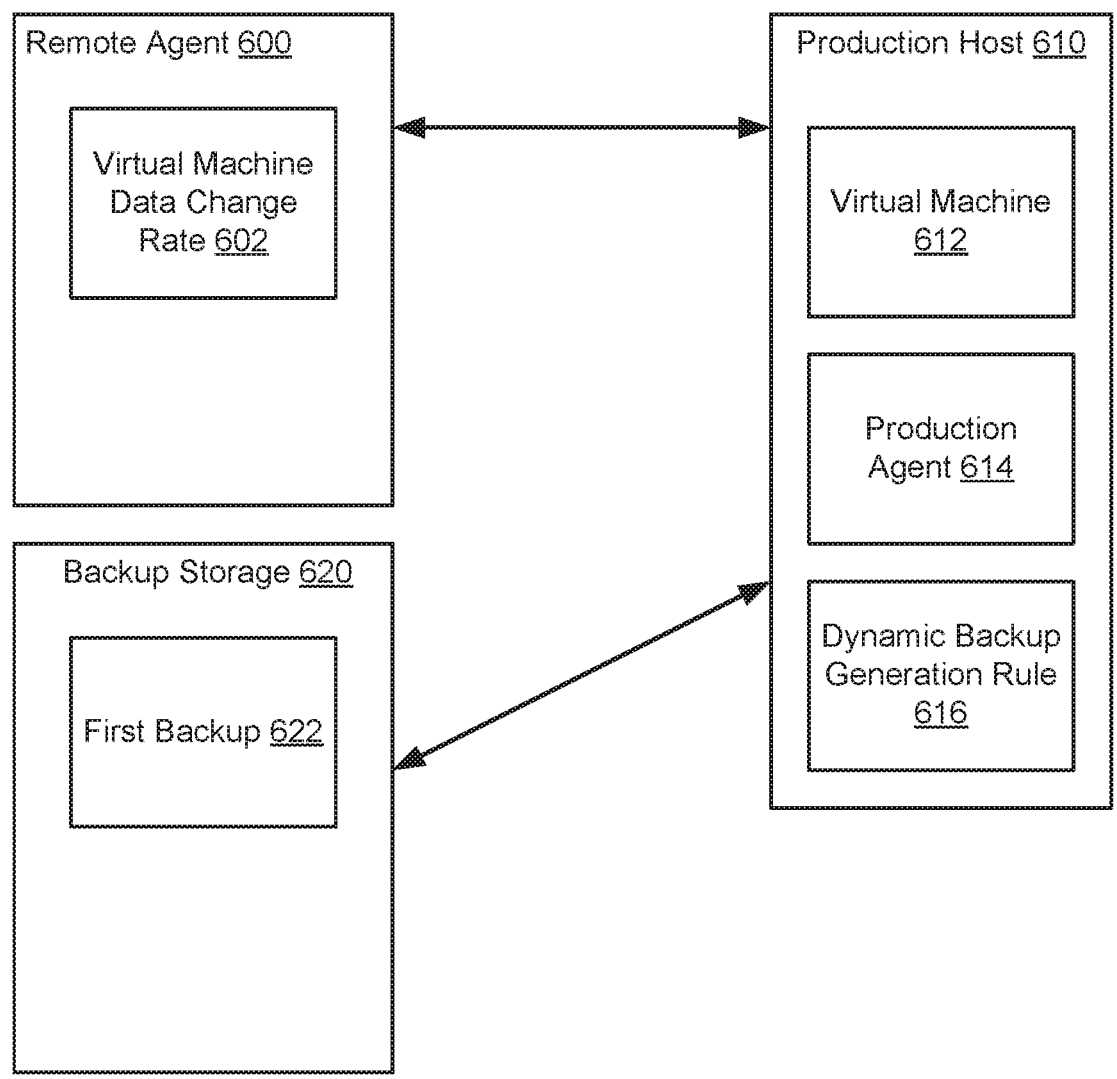
FIG. 6.2

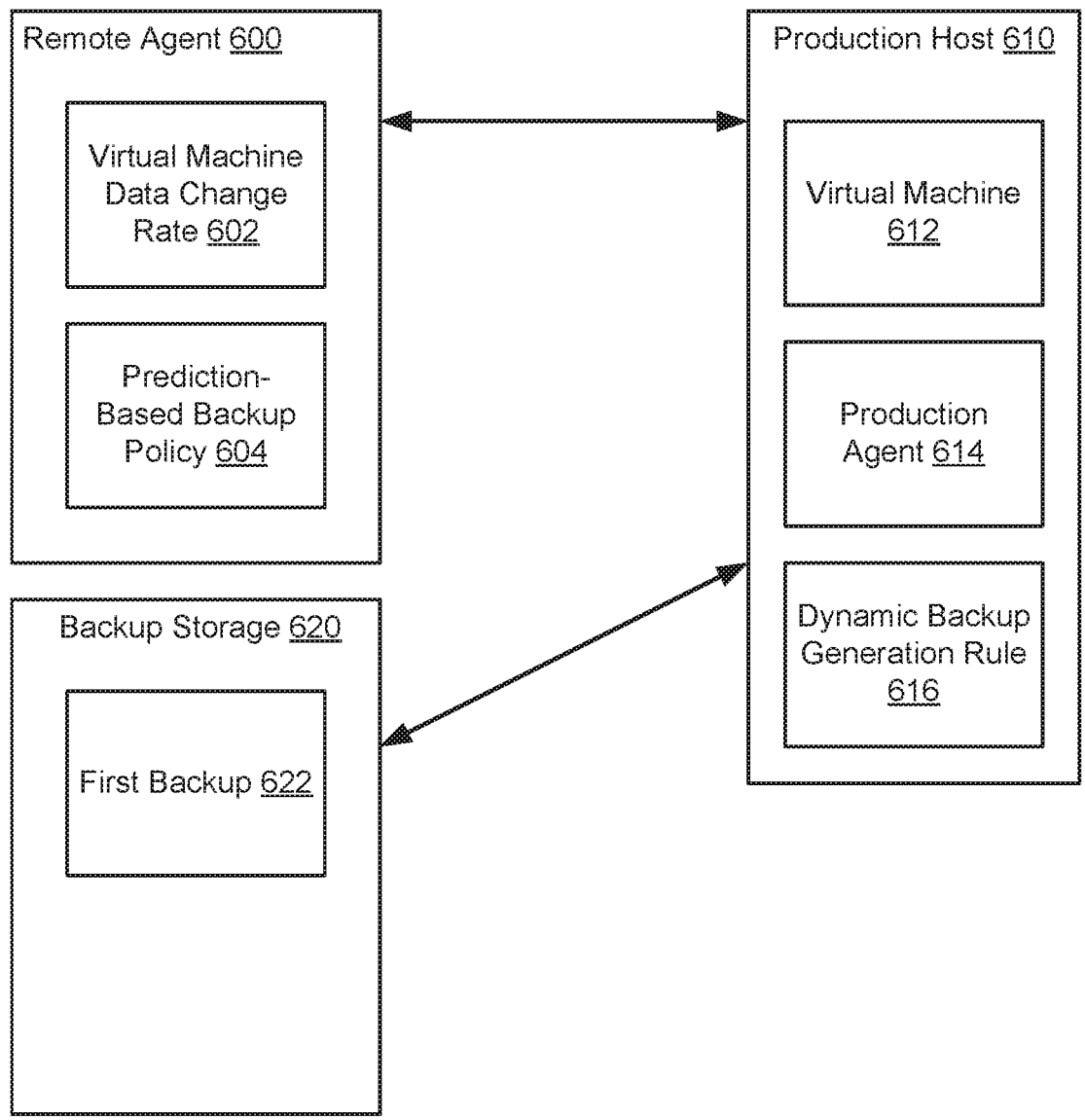
FIG. 6.3

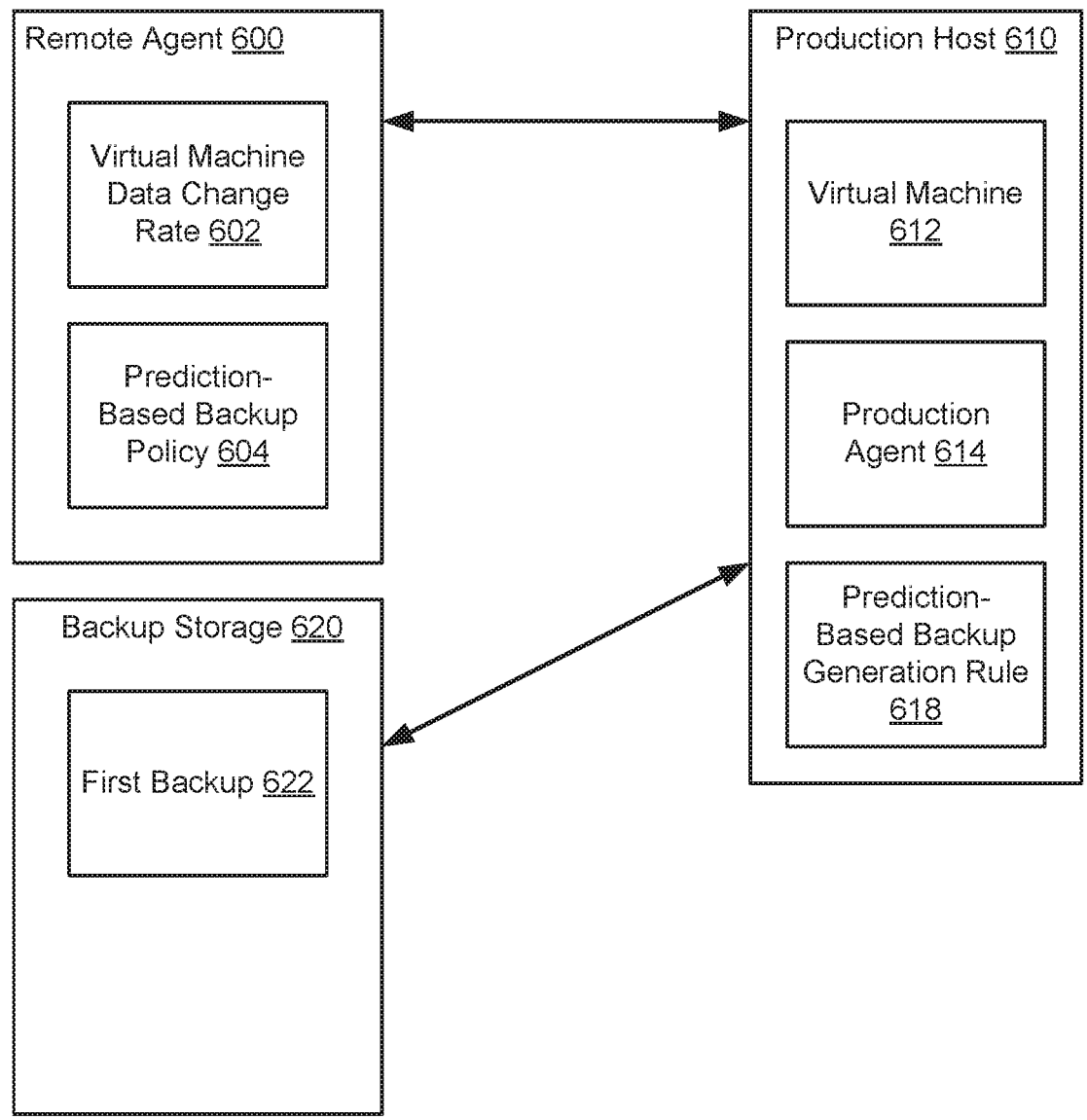
FIG. 6.4

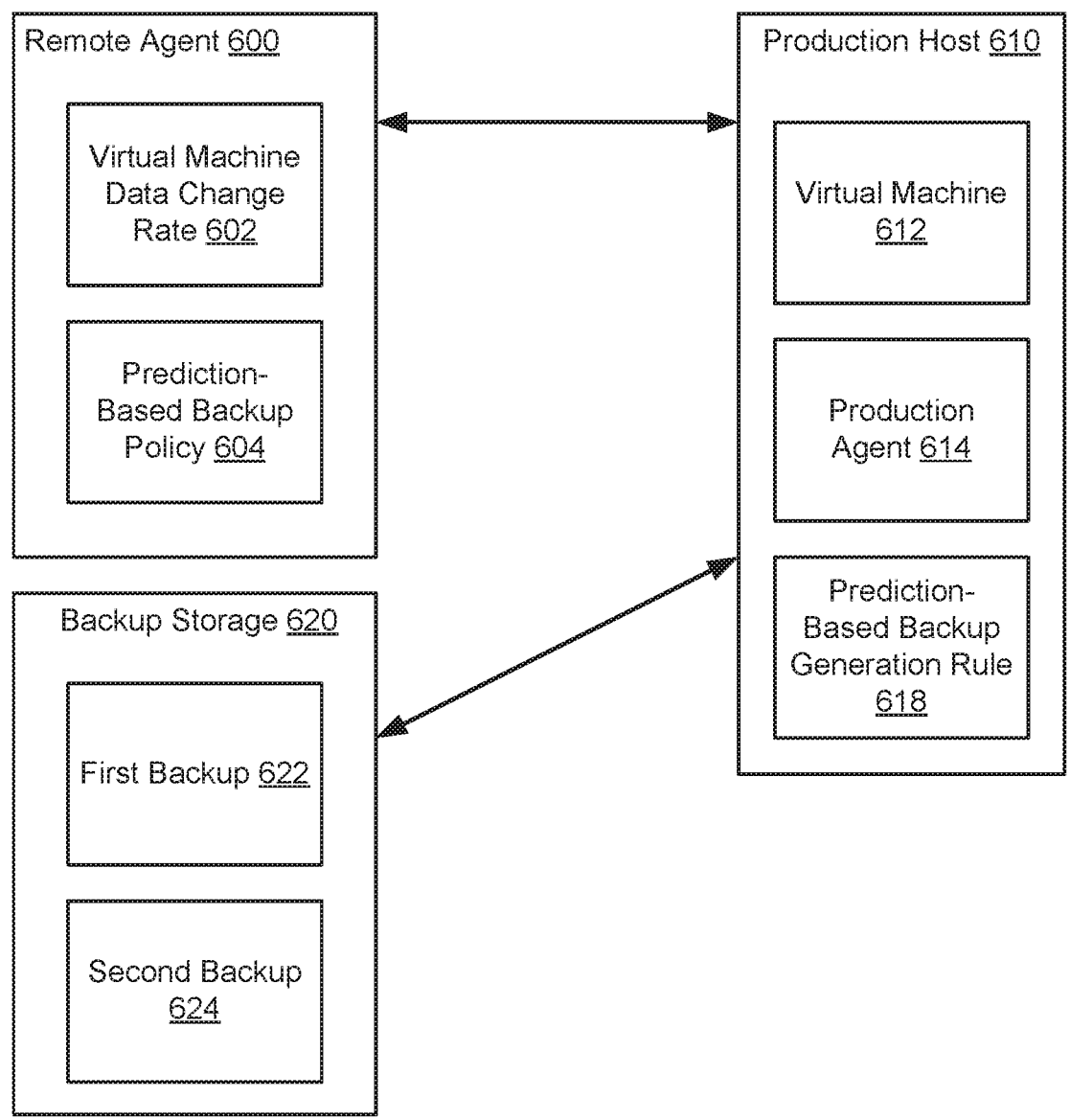
FIG. 6.5

SYSTEM AND METHOD FOR PREDICTIVE BACKUP IN A DISTRIBUTED ENVIRONMENT

BACKGROUND

Computing devices may generate data during their operation. For example, applications hosted by the computing devices may generate data used by the applications to perform their functions. Such data may be stored in persistent storage of the computing devices. The persistent storage may be a hard disk drive.

SUMMARY

In one aspect, a production host for hosting virtual machines in accordance with one or more embodiments of the invention includes a persistent storage that stores virtual machine data of the virtual machines and a production agent that obtains a dynamic backup generation rule for the virtual machines; for a predetermined period of time after obtaining the dynamic backup generate rule: generates first backups of the virtual machines based on the dynamic backup generate rule; and identifies a change rate of the virtual machine data; after the predetermined period of time, obtain a prediction-based backup generation rule that is based on the change rate of the virtual machine data over the predetermined period of time; and generates second backups of the virtual machines based on the prediction-based backup generation rule.

In one aspect, a method for hosting virtual machines in accordance with one or more embodiments of the invention includes obtaining a dynamic backup generation rule for the virtual machines; for a predetermined period of time after obtaining the dynamic backup generate rule: generating first backups of the virtual machines based on the dynamic backup generate rule; and identifying a change rate of virtual machine data of the virtual machines; after the predetermined period of time, obtaining a prediction-based backup generation rule that is based on the change rate of the virtual machine data over the predetermined period of time; and generating second backups of the virtual machines based on the prediction-based backup generation rule.

In one aspect, a non-transitory computer readable medium in accordance with one or more embodiments of the invention includes computer readable program code, which when executed by a computer processor enables the computer processor to perform a method for hosting virtual machines, the method includes obtaining a dynamic backup generation rule for the virtual machines; for a predetermined period of time after obtaining the dynamic backup generate rule: generating first backups of the virtual machines based on the dynamic backup generate rule; and identifying a change rate of virtual machine data of the virtual machines; after the predetermined period of time, obtaining a prediction-based backup generation rule that is based on the change rate of the virtual machine data over the predetermined period of time; and generating second backups of the virtual machines based on the prediction-based backup generation rule.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 6.1 shows a diagram of an example system at a first point in time.

FIG. 6.2 shows a diagram of the example system of FIG. 6.1 at a second point in time.

FIG. 6.3 shows a diagram of the example system of FIG. 6.1 at a second point in time.

FIG. 6.4 shows a diagram of the example system of FIG. 6.1 at a second point in time.

FIG. 6.5 shows a diagram of the example system of FIG. 6.1 at a second point in time.

DETAILED DESCRIPTION

Figure 1:
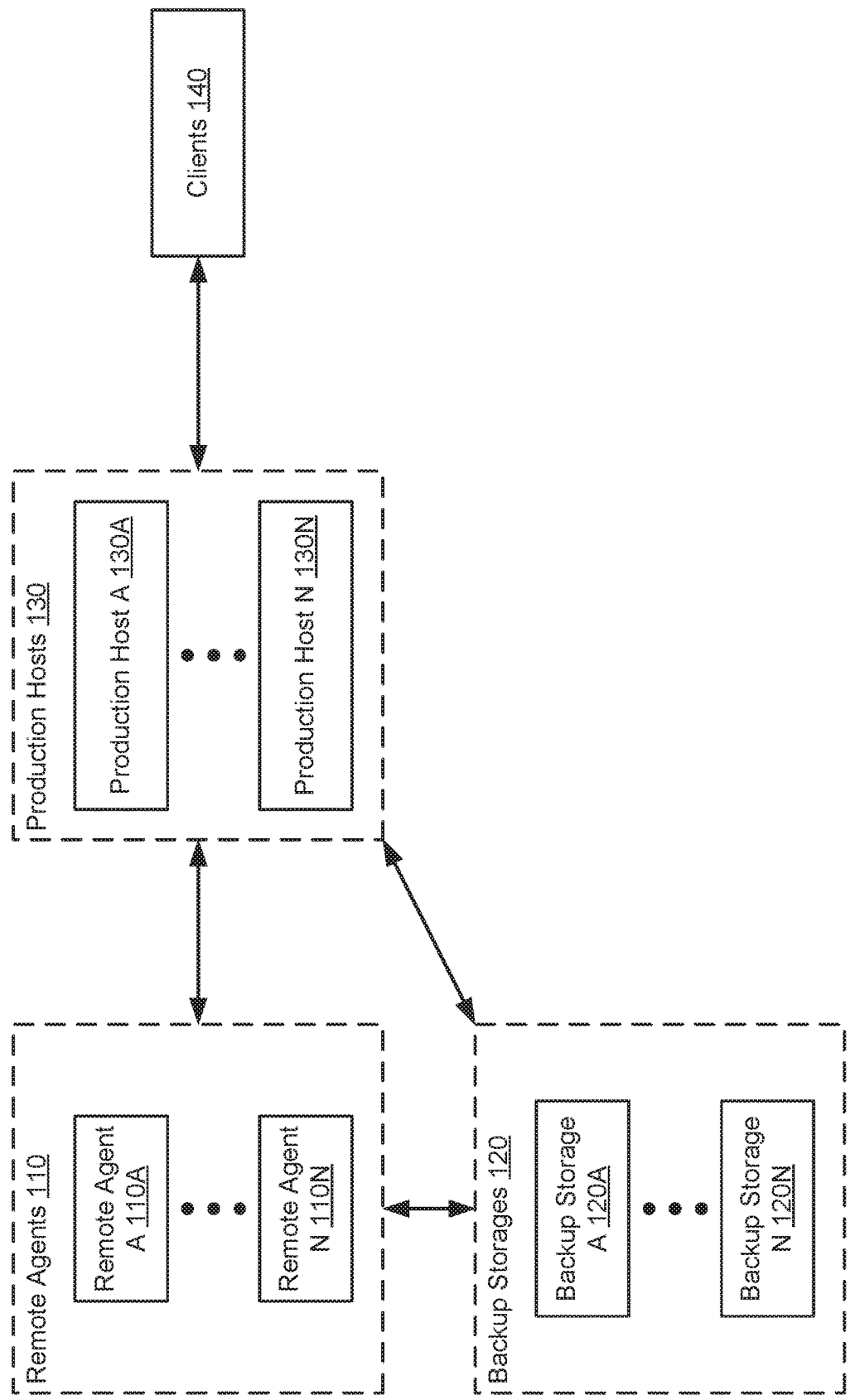
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing virtual machines in a distributed environment. More specifically, embodiments of the invention provide efficient methods for generation of backups of the virtual machines. For example, embodiments of the invention may limit frequency of backup generation to reduce resource consumption for backup generation purposes without negatively impacting the ability of the distributed system to provide restoration services to the virtual machines.

In one or more embodiments of the invention, the system utilizes different types of backup generation rules. For example, a first type of backup generation rule may specify that backups are generated when changes to a virtual machine exceed a predetermined threshold. The threshold may be when 2% of the data of the virtual machine has been changed. The threshold may be other types of thresholds without departing from the invention. In one or more embodiments of the invention, the threshold is set on a per virtual machine basis. In other words, thresholds may be set for each of the virtual machines; each of the set thresholds may be different.

A second type of backup generation rule may specify the backups are generated at predetermined points in time. The predetermined points in time may be based on previously identified changes to virtual machine data. For example, all the first type backup generation rule is implemented the changes to the virtual machine data that trigger generation of backup may be recorded. The recorded changes in the virtual machine data to be analyzed to then predict when backups of the virtual machines should be generated in the future. By doing so, embodiments of the invention may generate rules that predict when backups should be generated in anticipation of future changes virtual machine data.

FIG. 1 shows an example system in accordance with one or more embodiments of the invention. The system may include clients (140) that obtain services from virtual machines hosted by production hosts (130). For example, the production hosts (130) may host virtual machines that host applications. The clients (140) may utilize application services of the applications. The applications may be, for example, database applications, electronic communication applications, file storage applications, or any other type of application that may provide services to the clients (140). By utilizing such services, data that is relevant to the clients (140) may be stored in the production hosts (130).

To improve the likelihood that data stored in the production hosts (130) is available for future use, backups of the production hosts (130) may be generated and stored in the backup storages (120). A backup of one of the production hosts (130) may include data that may be used to restore the production host, or an entity hosted by the production host, to a previous state.

The system may also include remote agents (110) the provide backup services to the production hosts (130). The backup services may include generating and storing backups for the production hosts (130) in backup storages (120). The backup services may also include performing restorations of the production hosts (130) using backups stored in the backup storages (120). Performing restoration of a production host (e.g., 130A, 130N) they return the production host, or an entity hosted by the production host, to a previous state.

The components of the system illustrated in FIG. 1 may be operably connected to each other and/or operably connected to other entities (not shown) via any combination of wired and/or wireless networks. Each component of the system illustrated in FIG. 1 is discussed below.

The clients (140) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or portion, of the methods illustrated in FIGS. 4-5. The clients (140) may be other types of computing devices without departing from the invention. For additional details regarding computing devices, refer to FIG. 7.

The clients (140) may be logical devices without departing from the invention. For example, the clients (140) may be virtual machines that utilize computing resources of any number of physical computing devices to provide the functionality of the clients (140).

In one or more embodiments of the invention, the clients (140) utilize application services provided by production hosts (130). For example, the clients (140) may utilize database services, electronic communication services, file storage services, or any other type of computer implemented service provided by applications hosted by the production hosts (130). By utilizing the aforementioned services, data that is relevant to the clients (140) may be stored as part of application data of the applications hosted by the production hosts (130).

For example, consider a scenario in which a client utilizes file storage services provided by an application of the production hosts (130) by uploading an image to an application hosted by the production hosts (130). In response to receiving the uploaded image, the application may store a copy of the image locally in the production hosts (130). At a future point in time, the client that uploaded the image, or another entity, may desire to retrieve a copy of the image from the production hosts (130) and thereby render data, i.e., the copy of the image sort of the production hosts (130), stored in the production hosts (130) to be relevant to the clients (140). One or more embodiments of the invention may improve the likelihood that data that is relevant to the clients (140) and stored in the production hosts (130) is retrievable from the production hosts (130) at future points in time. Embodiments of the invention may provide such functionality by generating and storing backups of the production hosts, or portions of the production hosts, in backup storages (120).

In one or more embodiments of the invention, the production hosts (130) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or portion, of the methods illustrated in FIGS. 4-5. The production hosts (130) may be other types of computing devices without departing from the invention. For additional details regarding computing devices, refer to FIG. 7.

In one or more embodiments of the invention, the production hosts (130) are distributed computing devices. As used herein, a distributed computing device refers to functionality provided by a logical device that utilizes the computing resources of one or more separate and/or distinct physical computing devices. For example, in one or more embodiments of the invention, the production hosts (130) may be distributed devices that include components distributed across any number of separate and/or distinct computing devices. In such a scenario, the functionality of the production hosts (130) may be performed by multiple, different computing devices without departing from the invention.

A system in accordance with one or more embodiments of the invention may include any number of production hosts (e.g., 130A, 130N) without departing from the invention. For example, a system may include a single production host (e.g., 130A) or multiple production hosts (e.g., 130A, 130N).

In one or more embodiments of the invention, the production hosts (130) provide services to the clients (140). The services may be any type of computer implemented service such as, for example, database services, electronic communication services, data storage services, and/or instant messaging services. When providing such services to the clients (140), data that is relevant to the clients (140) may be stored in persistent storage of the production hosts (130).

In one or more embodiments of the invention, the production hosts (130) perform backup services such as, for example, generating and storing backups in backup storages (120). By storing backups in the backup storages (120), copies of data stored in persistent storage of the production hosts (130) may be redundantly stored in the backup storages (120). By redundantly storing copies of data in both the production hosts (130) and the backup storages (120), it may be more likely that the stored data will be able to be retrieved at a future point in time. For example, if a production host (e.g., 130A) suffers a catastrophic failure or other type of data loss/corruption event, the data on the production hosts persistent storage may be lost. However, because copy of the data may be stored in the backup storages (120), it may be possible to retrieve the data for use after the catastrophic failure. Thus, embodiments of the invention may improve reliability of data storage in a distributed system.

In one or more embodiments of the invention, the production hosts (130) perform backup services under the direction of the remote agents (110). For example, the production hosts (130) may receive instructions from the remote agents with respect to backup services and take action in response instructions. In one or more embodiments of the invention, each of the production hosts (130) may include one or more production agents that are cast with performing backup services in accordance with instructions sent by remote agents (110). For example, the remote agents (110) may send instructions to the production agents regarding the performance of backup services. In response to receipt of the instructions, the production agents may act to perform backup services in compliance with the received instructions.

Figure 2:
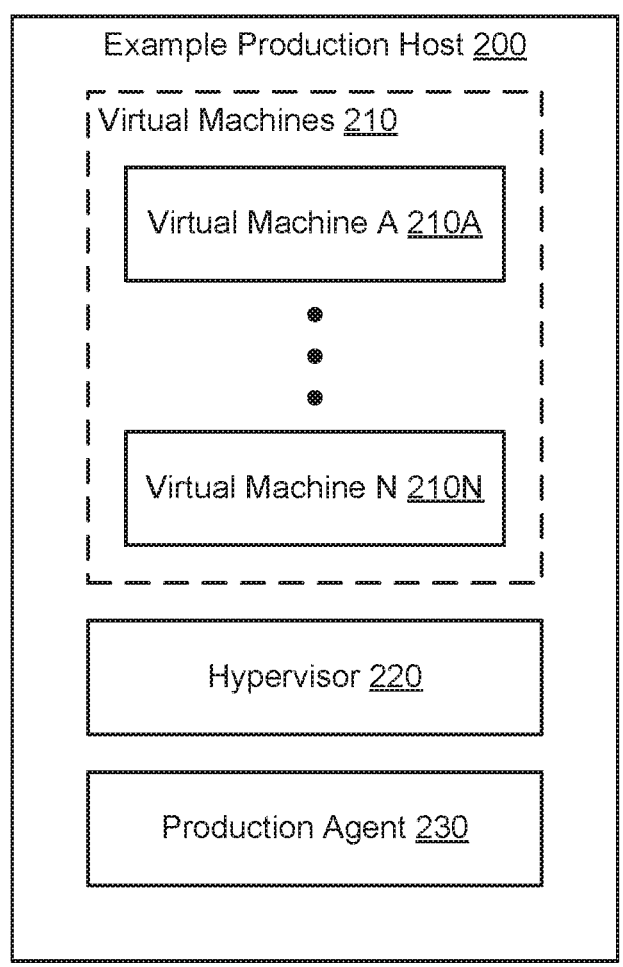
FIG. 2 shows a diagram of an example production host in accordance with one or more embodiments of the invention.

For additional details regarding the production hosts (130), refer to FIG. 2.

In one or more embodiments of the invention, the backup storages (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device that cause the computing device to provide the functionality of the backup storages (120) described through this application and all, or a portion, of the methods illustrated in FIG. 4-5. The backup storages (120) may be other types of computing devices without departing from the invention. For additional details regarding computing devices, refer to FIG. 7.

In one or more embodiments of the invention, the backup storages (120) are distributed computing devices. As used herein, a distributed computing device refers to functionality provided by a logical device that utilizes the computing resources of one or more separate and/or distinct computing devices. For example, in one or more embodiments of the invention, the backup storages (120) may be distributed devices that include components distributed across any number of separate and/or distinct computing devices. In such a scenario, the functionality of the backup storages (120) may be performed by multiple, different computing devices without departing from the invention.

In one or more embodiments of the invention, the backup storages (120) provide data storage services to the production hosts (130). The data storage services may include storing of data provided by the production hosts (130) and providing of previously stored data to the production hosts (130). The system may include any number of backup storages (e.g., 120A, 120N) without departing from the invention. For example, the system in accordance with embodiments of the invention may only include a single backup storage (e.g., 120A) or may include multiple backup storages (e.g., 120A, 120N).

In one or more embodiments of the invention, the data stored by the backup storages (120) includes backups of virtual machines and/or applications hosted by the production hosts (130). For example, the production hosts (130) may host a virtual machine that hosts a database application. To generate backup of the database, a backup of the virtual machine hosting the database may be generated and the backup may be sent to the backup storages (120) for storage. At a future point in time, it may become desirable to restore the state of the database managed by the database application to a previous state. To do so, the previously stored backup of the virtual machine stored in the backup storages (120) may be retrieved. The retrieved backup may be used to restore virtual machine hosting the database to a state associated with the backup, i.e., the desired previous state.

Additionally, application level backups may be stored in backup storage (120), rather than in virtual machine level backups. Thus, backups of the production hosts (130) may be generated at any level of granularity with respect to the data stored in the production hosts (130).

While described above as storing backups of virtual machines, applications, and/or production hosts (130), the backup storages (120) may store other types of data from the production hosts (130), or other entities, without departing from the invention. For example, the backup storages (120) may store archives or other data from the clients (140) or other entities.

In one or more embodiments of the invention, the remote agents (110) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device that cause the computing device to provide the functionality of the remote agents (110) described through this application and all, or a portion, of the methods illustrated in FIG. 4-5. The remote agents (110) may be other types of computing devices without departing from the invention. For additional details regarding computing devices, refer to FIG. 7.

In one or more embodiments of the invention, the remote agents (110) are distributed computing devices. As used herein, a distributed computing device refers to functionality provided by a logical device that utilizes the computing resources of one or more separate and/or distinct computing devices. For example, in one or more embodiments of the invention, the remote agents (110) may be distributed devices that include components distributed across any number of separate and/or distinct computing devices. In such a scenario, the functionality of the remote agents (110) may be performed by multiple, different computing devices without departing from the invention.

In one or more embodiments of the invention, the remote agents (110) orchestrate provisioning of backup services to the production hosts (130). For example, the remote agents (110) may initiate the process of backup generation for the production hosts (130) and storage of the generated backups in the backup storages (120). Additionally, the remote agents (110) may orchestrate restoration of the production hosts (130) using backups stored in the backup storages (120). For example, remote agents (110) may initiate copying of backups from the backup storages to the production hosts and initiation of restoration using the copied backups. The system of FIG. 1 may include any number of remote agents (e.g., 110A, 110N).

In one or more embodiments of the invention, the remote agents (110) optimize the provisioning of backup services to the production hosts (130). For example, the remote agents (110) may analyze the data generation characteristics of each of the production hosts (130) and generate backup policies for the production hosts based on the analysis. By doing so, embodiments of the invention may: (i) reduce the computing resources utilize for backup generation, (ii) improve the reliability of data stored in the production hosts by reducing the likelihood that large amounts of data of the production hosts are not backed up for significant periods of time, and (iii) improve the availability of computing resources within a distributed system that includes the production hosts.

In one or more embodiments of the invention, the remote agents (110) provision backup generation services by sending instructions to other entities of the distributed system to orchestrate the provisioning of backup services to the production hosts (130). For example, the remote agents (110) may send messages that include instructions or actions to be formed by the other components of the system of FIG. 1. The instructions may be, for example, when to generate a backup, where to store the backup, when to perform a restoration, and/or which backups performing the restoration. The instructions may specify other actions to be taken without departing from the invention. The other components of the system of FIG. 1 may be programmed to perform the actions specified by the instructions and/or provide predetermined information to the remote agents (110) in response to receipt of instructions.

In one or more embodiments of the invention, the remote agents (110) may orchestrate provisioning of backup services to the production hosts (130) based on: (i) dynamic backup policies and (ii) prediction-based backup policies. The dynamic backup policies may specify that backups are to be generated in response to the occurrence of a predetermined event. In contrast, the prediction-base backup policy may specify the steps for generating backups at predetermined points in time. As will be discussed in greater detail below, the prediction-based backup policies may be generated based on data obtained via the dynamic backup policies. The policies may specify additional information regarding the lifecycle and/or use of backups without departing from the invention. For additional details regarding the remote agents (110), refer to FIG. 3.

While the system of FIG. 1 has been described and illustrated as including a limited number of components for the sake of brevity, a system in accordance with embodiments of the invention may include additional, fewer, and/or different components than those illustrated in FIG. 1 without departing from the invention.

As discussed above, production hosts may host virtual machines, applications, or other entities that provide services to the clients. FIG. 2 shows a diagram of an example production host (200) in accordance with one or more embodiments of the invention. The example production host (200) may be similar to any of the production hosts (130, FIG. 1). As discussed above, the example production hosts (200) may provide: (i) application services to the clients and (ii) backup services to the entities that provide the application services to the clients.

To provide the aforementioned functionality of the example production host (200), the example production host (200) may include virtual machines (210), a hypervisor (220), and a production agent (230). Each component of the example production host (200) is discussed below.

The virtual machines (210) may be applications. For example, the virtual machines (210) may be applications executing using physical computing resources of the example production host (200). In other words, each of the virtual machines (210) may be implemented as computer instructions stored on a persistent storage that when executed by a processor of the example production host (200) give rise the functionality of the respective virtual machine. The example production host (200) may host any number of virtual machines (e.g., 210A, 210B) without departing from the invention.

Each of the virtual machines (210) may host any number of applications. The applications may provide application services to clients or other entities. For example, the applications may be database applications, electronic communication applications, filesharing applications, and/or other types of applications. Each of the virtual machines (210) may host any number of applications without departing from the invention.

Each of the applications may perform similar or different functions. For example, a first application may be a database application and a second application may be an electronic communications application. In another example, a first application may be a first instance of a database application and a second application may be a second instance of the database application.

In one or more embodiments of the invention, all, or portion, of the applications provide application services to clients. The provided services may correspond to the type of application of each of the applications. When providing application services to the clients, data that is relevant to the clients may be received by and/or generated by the applications. The applications may store such relevant data as part of the application data associated with respective applications in persistent storage.

In some embodiments of the invention, portions, or all, of the application data may be stored remotely from the example production host (200). For example, the application data may be stored in a second production host, or another entity, that does not host the applications. The application data may be stored in other locations without departing from the invention.

While the applications have been described above as being hosted by the virtual machines (210), the applications may not be hosted by virtual machines without departing from the invention. For example, the applications may be executing natively on the example production host (200) rather than in a virtualized resource.

The hypervisor (220) may manage execution of the virtual machines (210). The hypervisor (220) may instantiate and/or terminate any of the virtual machines (210). The hypervisor (220) may also allocate computing resources of the example production host (200) to each of the virtual machines (e.g., 210A, 210N).

For example, the hypervisor (220) may allocate a portion of the persistent storage of the example production host (200). Any quantity of storage resources of the persistent storage may be allocated in any manner in any scheme among the virtual machines (e.g., 210A, 210N).

While discussed with respect to storage resources, the hypervisor (220) may allocate other types of computing resources to the virtual machines (210), and/or other entities hosted by the example production host (200), without departing from the invention. For example, the hypervisor (220) may allocate processor cycles, memory capacity, memory bandwidth, and/or network communication bandwidth among the virtual machines (210) and/or other entities hosted by the example production host (200).

In one or more embodiments of the invention, the hypervisor (220) is a hardware device including circuitry. The hypervisor (220) may be, for example, a digital signal processor, a field programmable gate array, or an application specific integrated circuit. The hypervisor (220) may be other types of hardware devices without departing from the invention.

In one or more embodiments of the invention, the hypervisor (220) is implemented as computing code stored on a persistent storage that when executed by a processor performs the functionality of the hypervisor (220). The processor may be a hardware processor including circuitry such as, for example, a central processing unit or a microcontroller. The processor may be other types of hardware devices for processing digital information without departing from the invention.

The production agent (230) may locally manage provisioning of backup services to the virtual machines (210). For example, the production agent (230) may orchestrate the generation of backups and storage of the generated backups in backup storage.

In one or more embodiments of the invention, the production agent (230) manages the provisioning of backup services the virtual machines (210) based on instructions received from one or more remote agents. These instructions may cause production agent (230) to take action to provide the backup services.

In one or more embodiments of the invention, the instructions from remote agents specify that backups are to be generated dynamically. For example, instructions may specify that backups are to be generated in response to predetermined events rather than at a particular point in time. The predetermined event may be the storage of a predetermined quantity of data by an entity hosted by the example production host (200) after a predetermined point in time.

For example, consider a scenario in which a remote agent sends an instruction to a production agent that specifies that backups for a virtual machine hosted by the example production host (200) are to be generated whenever the virtual machine stores 200 Gigabytes (GB) of data. In response to this instruction, the production agent (230) may monitor, or otherwise set up watches for, the data storage of the virtual machine. When the data storage of the virtual machine reaches 200 GB, the production agent may initiate a backup generation for the virtual machine.

In one or more embodiments of the invention, the production agent (230) includes functionality to report backup generation activity to remote agents. For example, the production agent (230) may monitor backups that are generated and send notifications of the generated backups to the remote agents. By doing so, remote agents may be notified of the backup generations for the entities hosted by the example production host (200).

In one or more embodiments of the invention, the instructions from the remote agents specify a prediction-based backup generation schedule for backup generation. The prediction-based backup generation schedule for backup generation may specify predetermined points in time at which backups for a particular entity hosted by the example production host (200) is to be generated. In contrast to dynamic backup generation, a prediction-based based backup generation schedule may be more computationally efficient because only time must be monitored to identify when backups are to be generated.

In addition to backup generation, the provisioning of backup services provided by the production agent (230) may include performing restorations of the virtual machines (210) utilizing previously generated backups. Performing a restoration of a virtual machine may revert the virtual machine prior state associated with the backups used during the restoration. Thus, embodiments of the invention may improve the integrity of application data because the application data, if corrupted or lost, may be restored so long as appropriate backups have been generated. Accordingly, embodiments of the invention may improve data integrity in a distributed system by improving the likelihood that application data may be able to be restored by providing an efficient mechanism for generating backups for virtual machines.

Figure 4:
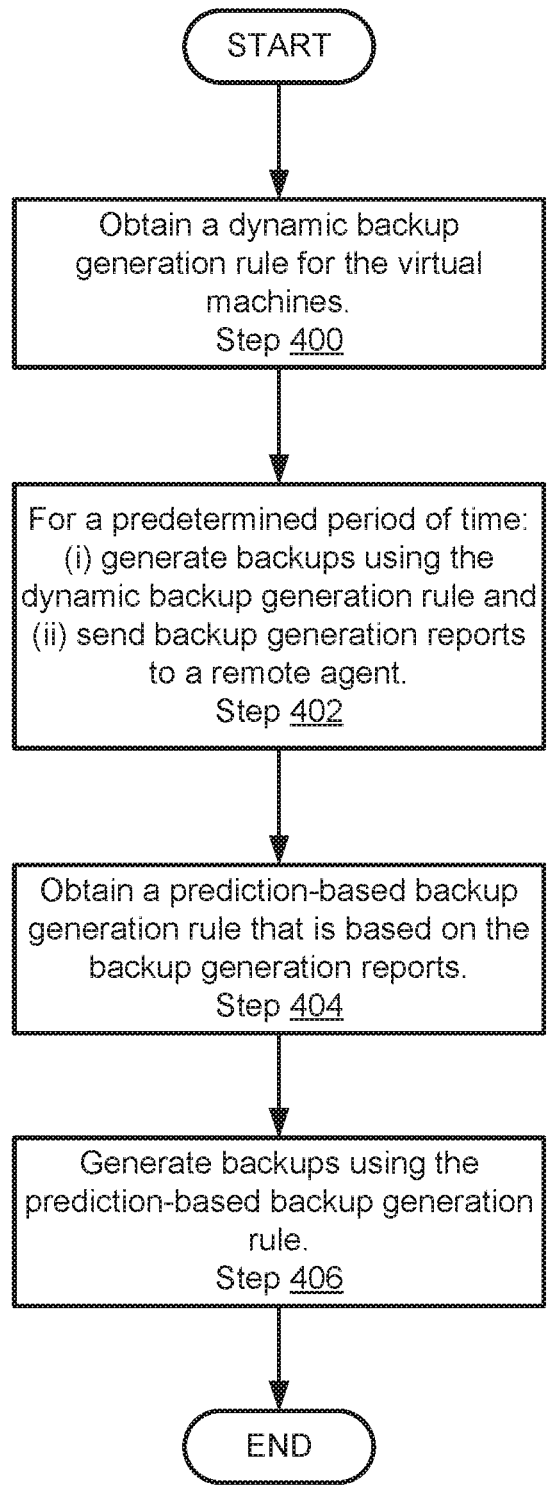
FIG. 4 shows a flowchart of a method of generating backups in accordance with one or more embodiments of the invention.
Figure 5:
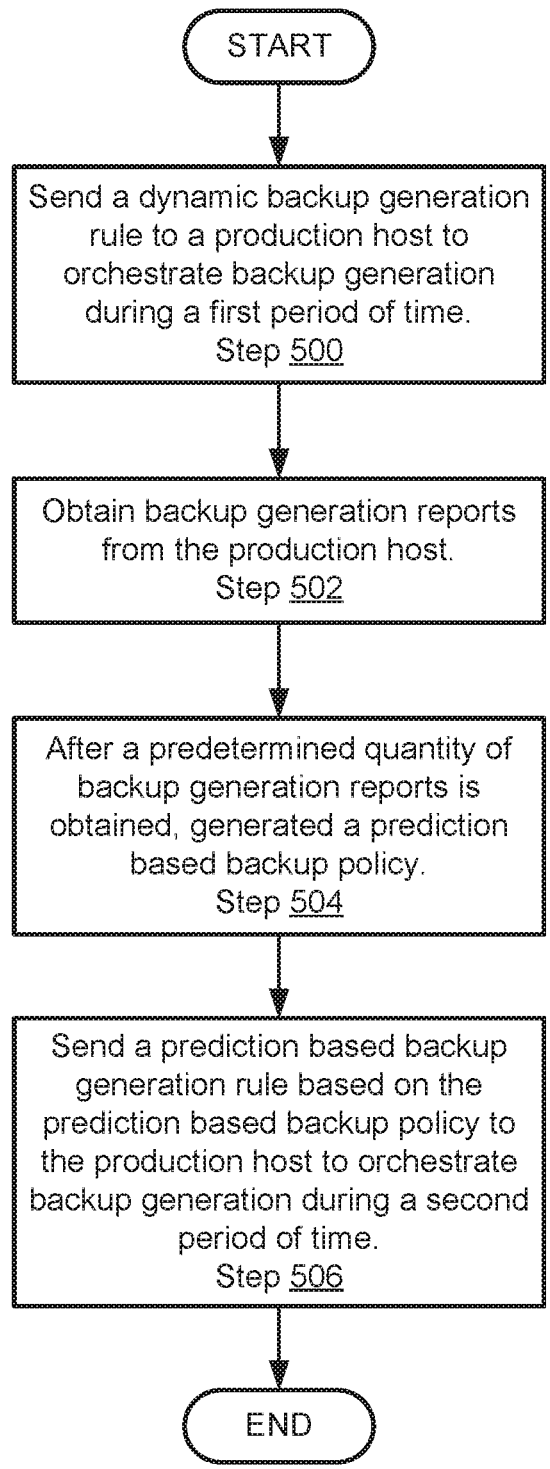
FIG. 5 shows a flowchart of a method of orchestrating the generation of backups in accordance with one or more embodiments of the invention.

To provide the above noted functionality of the production agent (230), the production agent (230) may perform all, or portion, of the methods illustrated in FIGS. 4-5.

In one or more embodiments of the invention, the production agent (230) is a hardened entity, i.e., not modifiable by an entity that is remote to a production host on which the production agent (230) is executing. In one or more embodiments of the invention, the production agent (230) is not configurable by modifying settings or associated configuration files via a remote terminal or other configuration utility.

In one or more embodiments of the invention, the production agent (230) is a hardware device including circuitry. The production agent (230) may be, for example, digital signal processor, a field programmable gate array, or an application specific integrated circuit. The production agent (230) may be other types of hardware devices without departing from the invention.

In one or more embodiments of the invention, the production agent (230) is implemented as computing code stored on a persistent storage that when executed by a processor performs the functionality of the production agent (230). The processor may be hardware processor including circuitry such as, for example, a central processing unit or a microcontroller. The processor may be other types of hardware devices for processing digital information without departing from the invention.

While the example production host (200) of FIG. 2 has been described and illustrated as including a limited number of components for the sake of brevity, a production host in accordance with embodiments of the invention may include additional, fewer, and/or different components than those illustrated in FIG. 2 without departing from the invention.

Figure 3:
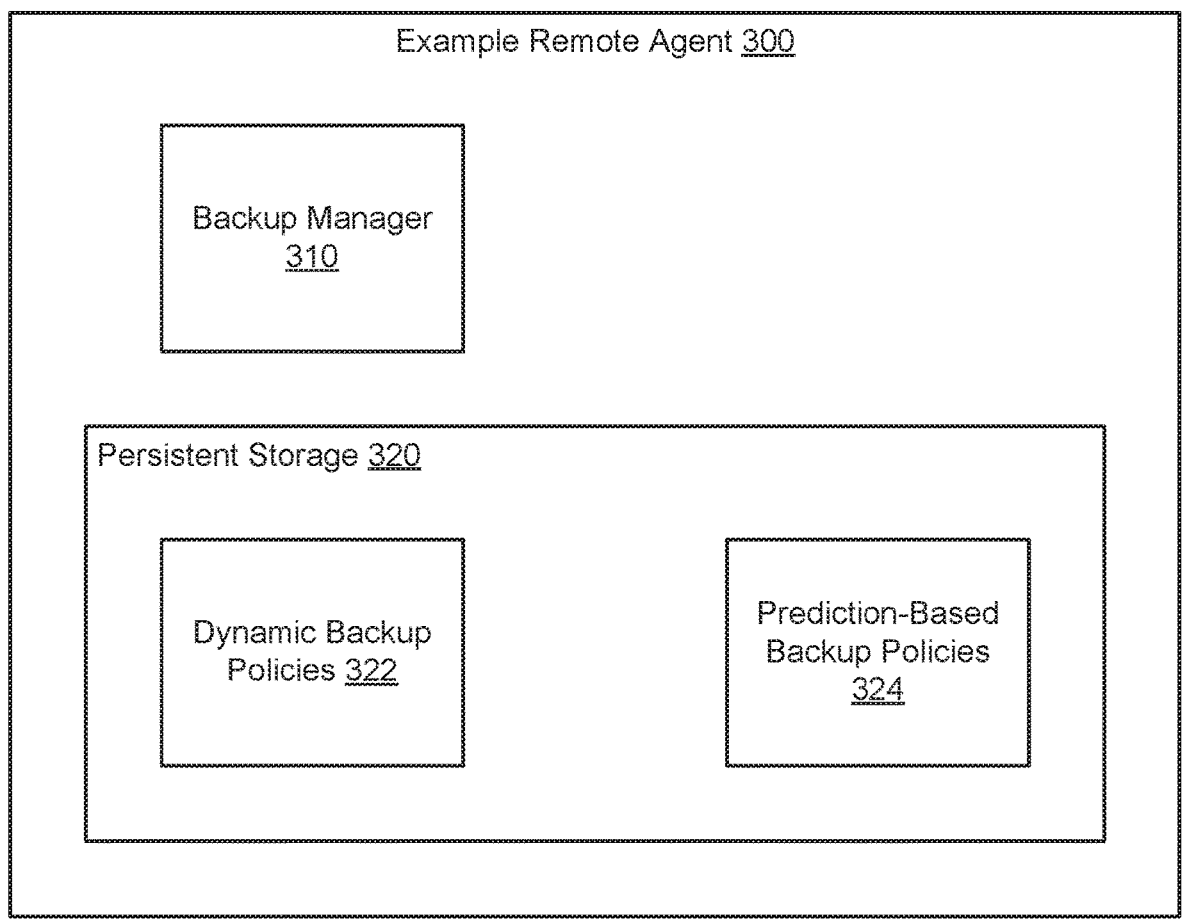
FIG. 3 shows a diagram of an example remote agent in accordance with one or more embodiments of the invention.

As discussed above, production hosts may provision backup services under the direction of remote agents. FIG. 3 shows a diagram of an example remote agent (300) in accordance with one or more embodiments of the invention. The example remote agent (300) may be similar to any of the remote agents (110, FIG. 1). As discussed above, the example remote agent (300) may orchestrate performance of backups and/or restorations within a distributed environment.

To provide the aforementioned functionality of the example remote agent (300), the example remote agent (300) may include a backup manager (310) and a persistent storage (320). Each component of the example production host (200) is discussed below.

In one or more embodiments of the invention, the backup manager (310) orchestrates the performance of restorations and/or backup generation within a distributed system. For example, the backup manager (310) may send instructions to any number of components of the distributed system. The backup manager (310) may send such instructions based on dynamic backup policies (322) and/or prediction-based backup policies (342) stored in the persistent storage (320).

In one or more embodiments of the invention, the backup manager (310) orchestrates to different types of backup generations: (i) dynamic backup generation and (ii) prediction-based backup generation. Each of these types of backup generation is discussed below.

In dynamic backup generation, the backup manager (310) may send instructions that cause backups to be generated in a dynamic fashion. For example, the backups may be generated in response to different types of events. The events may be, for example, storage or predetermined quantity of data, a dip or peak in a write rate of data, a duration of time, or any other type of event.

The instructions may include a number of different types of events that may trigger backup generation. For example, the instructions may specify that a backup is to be generated after 10 GB of data are written or eight hours have passed since the last backup was generated. The occurrence of either of these events may trigger generation of a backup.

In one or more embodiments of the invention, the backup manager (310) may specify data to be provided by the production hosts with respective backup generation activity. For example, the backup manager (310) may specify a report structure with any number of data elements to be provided by the production agent of a production host upon the occurrence of a backup generation or at other points in time. In response to receiving such request, the production agent of a production host may send the requested information at that time and/or going forward after receipt of specified report structure. By doing so, the remote agents may be appraised of the backup generation activity of the production hosts. Further, the remote agents may be appraised of backup generation activity of multiple production hosts.

In prediction-based backup generation, the backup manager (310) analyzes the previously received backup generation reports and generates a prediction-based backup policy for the production host. The generated prediction-based backup policy may be stored with other prediction-based backup policies (324).

The prediction-based backup policy may specify a predetermined schedule for backup generation. The predetermined schedule may be based on the backup generation reports obtained from the production hosts during dynamic backup generation. To generate the predetermined schedule, the backup manager (310) may identify particular points in time for backup generation based on, in part: when backups were generated, troughs in data storage rates, peaks in data storage rates, and/or other characteristics of the data storage behavior of the production hosts.

To provide the above noted functionality of the backup manager (310), the backup manager (310) may perform all, or portion, of the methods illustrated in FIGS. 4-5.

In one or more embodiments of the invention, the backup manager (310) is a hardware device including circuitry. The backup manager (310) may be, for example, digital signal processor, a field programmable gate array, or an application specific integrated circuit. The backup manager (310) may be other types of hardware devices without departing from the invention.

In one or more embodiments of the invention, the backup manager (310) is implemented as computing code stored on a persistent storage that when executed by a processor performs the functionality of the backup manager (310). The processor may be hardware processor including circuitry such as, for example, a central processing unit or a microcontroller. The processor may be other types of hardware devices for processing digital information without departing from the invention.

In one or more embodiments of the invention, the persistent storage (320) is a data storage device. For example, the persistent storage (320) may be any combination of hard disk drives, solid state disk drives, tape drives, and/or any other physical storage medium for the storage of data.

In one or more embodiments of the invention, the persistent storage (320) stores dynamic backup policies (322) and prediction-based backup policies (324). These policies may be data structures that specify workflows to generate backups. Each of the policies may be associated with production hosts and/or entities hosted by the production hosts. For example, a policy may be associated with a virtual machine hosted by a production host. The dynamic backup policies (322) and prediction-based backup policies (324) may include any number of policies without departing from the invention.

In one or more embodiments of the invention, the workflows specified by the dynamic backup policies (322) are dynamic in nature. In other words, the workflows may specify actions to be taken in response to the occurrence of one or more events. In contrast, the workflows specified by the prediction-based backup policies (324) are not dynamic in nature. In other words, the workflows specified of the prediction-based backup policies (324) are deterministic in nature. For example, the workflows specified by the prediction-based backup policies (324) may specify the generation of backups at predetermined points in time rather than in response to upon the occurrence of one or more events.

While the example remote agent (300) of FIG. 3 has been described and illustrated as including a limited number of components for the sake of brevity, a remote agent in accordance with embodiments of the invention may include additional, fewer, and/or different components than those illustrated in FIG. 3 without departing from the invention.

Returning to FIG. 1, the remote agents may orchestrate backup generation different during different periods of time to improve the efficiency of backup generation in a distributed environment. FIG. 4 illustrate methods may be performed by components of the system of FIG. 1 when providing such backup generations.

FIG. 4 shows a flowchart of a method in accordance with one or more embodiments of the invention. The method depicted in FIG. 4 be used to generate backups in accordance with one or more embodiments of the invention. The method shown in FIG. 4 may be performed by, for example, a production host (e.g., 130, FIG. 1). Other components of the system illustrated in FIG. 1 may perform all, or a portion, of the method of FIG. 4 without departing from the invention.

In step 400, a dynamic backup generation rule for a virtual machine is obtained.

In one or more embodiments of the invention, the dynamic backup generation rule is obtained from a remote agent that manages backup generation for the virtual machine.

In one or more embodiments of the invention, the dynamic backup generation rule is obtained based on an identity of the virtual machine. The backup generation rule may be obtained from dynamic backup generation policies. For example, the identity of the virtual machine may be matched to one of the dynamic backup generation policies. The matched dynamic backup generation policy may specify the rule.

In one or more embodiments of the invention, the dynamic backup generation rule specifies that a backup is to be generated in response to events. In one or more embodiments of the invention, the events include at least two different types of events. A first type of event of the events may be, for example, storage of a predetermined quantity of data by the virtual machine. A second type of event of the events may be, for example, a predetermined quantity of time passing since a backup was generated for the virtual machine. The events may include any number and type of event without departing from the invention.

In step 402, or predetermined period of time: (i) backups are generated using the dynamic backup generation rule and (ii) backup generation reports sent to a remote agent.

In one or more embodiments of the invention, the remote agent sent the dynamic backup generation rule.

In one or more embodiments of the invention, the backup generation reports specify the change rate of virtual machine data of the virtual machine. The backup generation reports may also specify when backups are generated based on the dynamic backup generation rule. The backup generation reports may specify additional, different, and/or less information without departing from the invention.

In one or more embodiments of the invention, backups are generated whenever the dynamic backup generation rule is met. For example, the production host may monitor the virtual machine, or other entities, to identify when the dynamic backup generation rule is met. In response to meeting the rule, a backup for the virtual machine may be generated.

In step 404, the prediction-based backup generation rule that is based on the backup generation reports is obtained.

In one or more embodiments of the invention, the prediction-based backup generation rule specifies that backups of the virtual machine are to be generated at predetermined points in time. For example, the prediction-based backup generation rule may specify a listing of dates and times upon the occurrence of which a backup for the virtual machine is to be generated. The prediction-based backup generation rule may specify the predetermined points in time via other methods without departing from the invention. For example, the prediction-based backup generation rule may specify a recurring schedule backup generation purposes.

In step 406, backups for the virtual machine are generated using the prediction-based backup generation rule.

In one or more embodiments of the invention, the backups are generated at predetermined points in time specified by the prediction-based backup generation rule.

The method may end following step 406.

FIG. 5 shows a flowchart of a method in accordance with one or more embodiments of the invention. The method depicted in FIG. 5 be used to orchestrate backup generation in accordance with one or more embodiments of the invention. The method shown in FIG. 5 may be performed by, for example, a remote agent (e.g., 110, FIG. 1). Other components of the system illustrated in FIG. 1 may perform all, or a portion, of the method of FIG. 5 without departing from the invention.

In step 500, a dynamic backup generation rule is sent to a production host to orchestrate backup generation during the first period of time.

In one or more embodiments of the invention, the dynamic backup generation rule is sent to the production host in response to a request from a production agent of the production host. For example, the production agent may send a request in response to an instantiation of the virtual machine in the production host.

In one or more embodiments of the invention, the dynamic backup generation rule specifies that backups are to be generated upon the occurrence of events. The events may be any type and/or quantity of event without departing from the invention.

In step 502, backup generation reports were obtained from the production host.

In one or more embodiments of the invention, the backup generation reports include virtual machine data change rate information. The virtual machine data change rate information may specify the quantity of data written by the virtual machine over time. The virtual machine data change rate information may be specified at any degree of granularity.

In one or more embodiments of the invention, the backup generation reports specify when backups for the virtual machine are generated based on the dynamic backup generation rule. For example, a backup generation report may be generated by a production agent and sent to a remote agent in response to each backup generation. Additionally, the backup generation reports may specify an event of the events specified by dynamic backup generation rule that triggered backup generation.

In one or more embodiments of the invention, the backup generation reports obtained by receiving them from a production agent of the production host. For example, the remote agent may have sent instructions regarding required informational content of backup generation reports to the production agent along with the dynamic backup generation rule.

In step 504, after a predetermined quantity of backup generation reports is obtained, a prediction-based backup policy generated.

In one or more embodiments of the invention, the prediction-based backup generation policy is generated based on the virtual machine data change rate information included in the backup generation reports. The virtual machine data change rate information may be analyzed to identify: (i) when predetermined quantities of information are stored by the virtual machine, (ii) periods of high data storage rates of the virtual machine, and/or (iii) periods of low data storage rates of the virtual machine. Based on this analysis, predetermined point in time the identified upon the occurrence of which backups of virtual machines are to be generated. For example, the predetermined points in time may be set based on when it is likely that a predetermined quantity of information is periodically written by the virtual machines. The predetermined point in time may then be adjusted to coincide with periods of low data storage rates by the virtual machine.

For further clarity, consider an example scenario in which a virtual machine stores 8 GB of data from 8 AM to 11 AM, 1 GB of data from 11 AM to 1 PM, and 10 GB of data from 1 PM to 4 PM, and 1 GB of data from 4 PM to 8 AM. In response to such a data set, the prediction-based backup policy may specify the backups are to be generated at 11 AM and 4 PM. By doing so, backup generations may coincide during periods of low data storage rates but before an excessively large quantity of data is stored without generation of a backup. This example is included for explanatory purposes only and should not be considered limiting for the purposes of this application.

In step 506, the prediction-based backup generation rule that is based on the prediction-based backup policy is sent to the production host to orchestrate backup generation during a second period of time.

In one or more embodiments of the invention, the prediction-based backup generation rule specifies predetermined points in time during which backups are to be generated. Each of the predetermined point in time you based on the prediction-based backup policy that was generated in step 504.

In response to receiving the prediction-based backup generation rule, a production agent may generate backups of the virtual machine at the predetermined points in time.

The method may end following step 506.

To further clarify embodiments of the invention, a non-limiting example is provided in FIGS. 6.1-6.5. Each of these figures may illustrate a system similar to that illustrated in FIG. 1 at different points in time during a backup generation process.

EXAMPLE

Consider a scenario has illustrated in FIG. 6.1 in which a remote agent (600) is managing the generation and storage of backups of a production host (610) in backup storage (620). The production host (610) may host a virtual machine (612) that provides services to clients (not shown).

At the point in time illustrated in FIG. 6.1, the virtual machine (612) may be newly instantiated and for which backups have not been previously generated. In response to the instantiation of the virtual machine (612), a production agent (614, tasked with providing backup services to the virtual machine (612) sends request to remote agent (600) for instruction with respect to backup generation for the virtual machine (612).

In response to the request, the remote agent (600) sends a dynamic backup generation rule (616) to the production host (610). The dynamic backup generation rule (616) specifies that backups for the virtual machine (612) are to be generated whenever the virtual machine (612) stores 10 GB of data.

Over a period of five hours, the production agent (614) monitors the data storage behavior of the virtual machine (612). In response to the monitoring, the production agent (614) generates and stores a first backup (622) in backup storage (620) when the virtual machine (612) stores its first 10 GB of data, as illustrated in FIG. 6.2.

Additionally, the production agent (614) generates a backup generation report including virtual machine data change rate (602) information which is sent to the remote agent (600). By doing so, the remote agent (600) is notified of the virtual machine data change rate (602).

Based on the virtual machine data change rate (602), the remote agent (600) generates a prediction-based backup policy (604). In contrast to the dynamic backup generation rule (616), the prediction-based backup policy (604) specifies that backups of the virtual machine (612) are to be generated every five hours, as illustrated in FIG. 6.3.

After generating the prediction-based backup policy (604), the remote agent (600) generates a prediction-based backup generation rule (618) which it sends to the production host (610) as illustrated in FIG. 6.4. Additionally, as seen from FIG. 6.4, the prediction-based backup generation rule (618) displaces the previous rule associated with the virtual machine (612) for backup generation purposes.

Based on the prediction-based backup generation rule (618), the production agent (614) waits five hours and generates a second backup (624) which is stores in backup storage (620), as illustrated in FIG. 6.5. Because the production agent (614) was not required to monitor the behavior of the virtual machine (612) during this five-hour period, and going forward, generation of the second backup (624) was more computationally efficient then the generation of the first backup (622) which required monitoring of the virtual machine (612).

Going forward, the production agent (614) will generate backups of the virtual machine (612) every five hours.

End of Example

While the example illustrated in FIGS. 6.1-6.5 is very simple, embodiments of the invention contemplate potentially more sophisticated scenarios. For example, dynamic backup generation rules may include a wide number and type of conditions that may trigger the generation of a backup thereby giving rise to a nuanced backup generation behavior. Additionally, while described with respect to generating a prediction-based backup policy (604) based on a single backup generation, prediction-based backup policies (604) may be generated based on multiple backups generated during a significant period of time (e.g., 10, 15, 30, 45, 60+ days) and thereby give rise to a nuanced prediction-based backup generation rule that reflects the likely data storage patterns of virtual machines over time.

Figure 7:
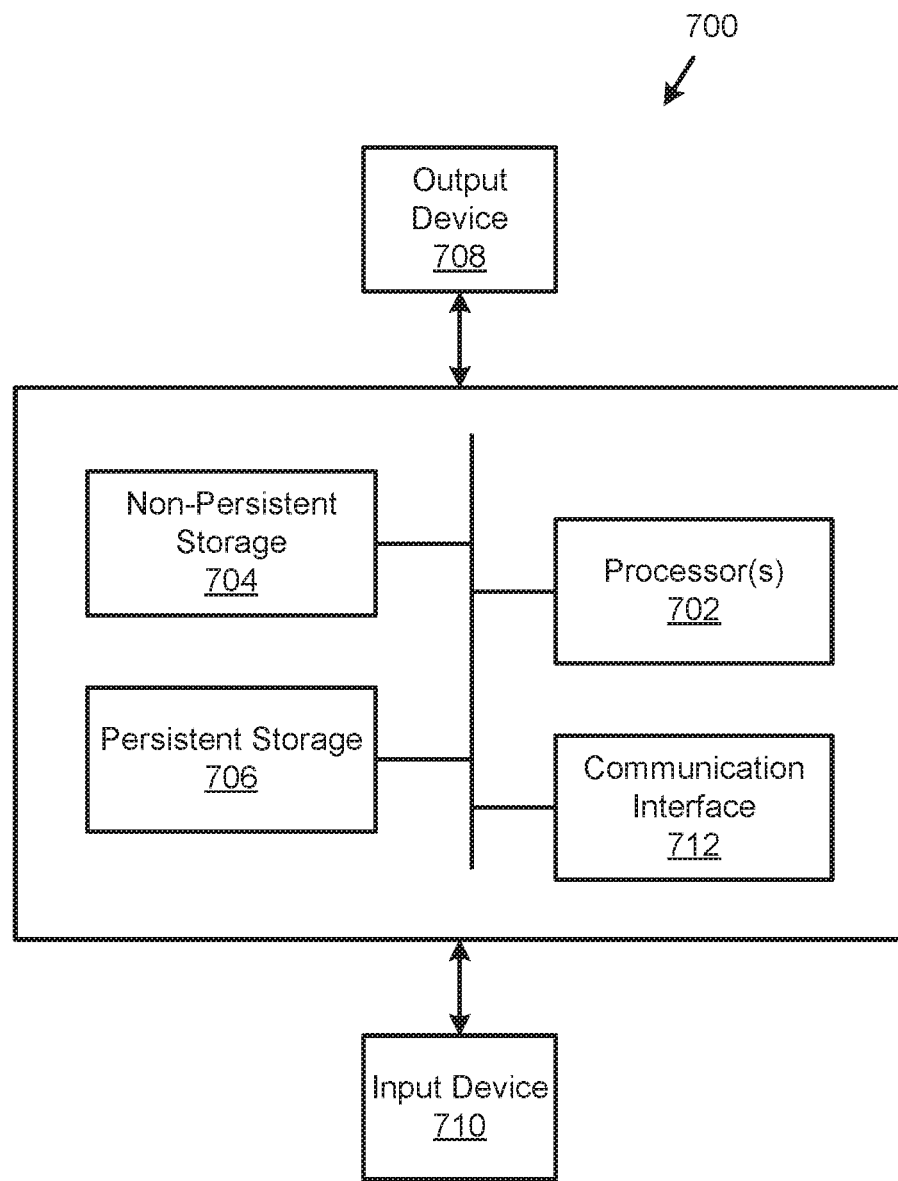
FIG. 7 shows a diagram of a computing device in accordance with one or more embodiments of the invention.

Any of the components of FIG. 1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide an improved method for generating backups in the distributed environment. One or more embodiments of the invention, the method reduces the computational burden for backup generation of virtual machines. Specifically, embodiments of the invention may monitor the data storage behavior the virtual machines over a first period of time and generate a predetermined schedule for backup generation during the second period of time. The predetermined schedule for backup generation may consume substantially fewer computing resources than those employed during the first period of time. Thus, embodiments of the invention may improve both the fields of backup generation technology and distributed systems by reducing the computing resources utilized for backup generation.

In contrast to single element systems, distributed systems may rely on redundancy for data integrity purposes rather than perfect operation. Thus, backup generation, and the computing resource cost for backup generation and storage, arise due to the technological nature of the environment of distributed systems which relies on redundancy. Accordingly, embodiments of the invention improve distributed system technology by reducing the computational cost of performing one of its underlined functions, that is, namely, redundancy your storage of multiple copies of data in multiple locations.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A production host for hosting virtual machines, comprising:
    a persistent storage that stores virtual machine data of the virtual machines; and
    a production agent programmed to:
        obtain a dynamic backup generation rule for the virtual machines, wherein the dynamic backup generation rule specifies that a backup for a virtual machine is to be generated in response to an event, wherein the event is one selected from a group consisting of a certain amount of data has been stored by the virtual machine and a predetermined quantity of time has passed since a last time the virtual machine was backed up;
        during a predetermined period of time after obtaining the dynamic backup generation rule:
            generate a first set of backups of the virtual machine based on the dynamic backup generation rule; and
            obtain virtual machine data change rate information for the virtual machine,
            send the virtual machine data change rate information to a remote agent,
            wherein a duration of the predetermined period of time is set such that a sufficient amount of virtual machine data change rate information may be collected in order to generate a prediction-based backup generation rule;
        after the predetermined period of time, obtain, from the remote agent, the prediction-based backup generation rule, wherein the prediction-based backup generation rule is based on the virtual machine data change rate information that was obtained by the production host over the predetermined period of time, wherein the dynamic backup generation rule is not used to back up the virtual machine after the predetermined period of time; and
        generate a second set of backups of the virtual machine based on the prediction-based backup generation rule,
        wherein the prediction-based backup generation rule is generated based on an analysis of the virtual machine data change rate information by the remote agent, and
        wherein the analysis determines when predetermined quantities of data are stored by the virtual machine, periods of high data storage rates of the virtual machine, and periods of low data storage rates of the virtual machine.

2. The production host of claim 1, wherein the prediction-based backup generation rule specifies that the second set of backups of the virtual machine is generated at predetermined points in time.

3. The production host of claim 2, wherein the first set of backups of the virtual machine is not generated at predetermined points in time.

4. A method for hosting virtual machines, comprising:
    obtaining a dynamic backup generation rule for the virtual machines, wherein the dynamic backup generation rule specifies that a backup for a virtual machine is to be generated in response to an event, wherein the event is one selected from a group consisting of a certain amount of data has been stored by the virtual machine and a predetermined quantity of time has passed since a last time the virtual machine was backed up;
    during a predetermined period of time after obtaining the dynamic backup generation rule:
        generating a first set of backups of the virtual machine based on the dynamic backup generation rule; and
        obtaining virtual machine data change rate information for the virtual machine,
        sending the virtual machine data change rate information to a remote agent, wherein a duration of the predetermined period of time is set such that a sufficient amount of virtual machine data change rate information may be collected in order to generate a prediction-based backup generation rule;

after the predetermined period of time, obtaining, from the remote agent, the prediction-based backup generation rule wherein the prediction-based backup generation rule is based on the virtual machine data change rate information that was obtained by the production host over the predetermined period of time, wherein the dynamic backup generation rule is not used to back up the virtual machine after the predetermined period of time; and generating a second set of backups of the virtual machine based on the prediction-based backup generation rule, wherein the prediction-based backup generation rule is generated based on an analysis of the virtual machine data change rate information by the remote agent, and wherein the analysis determines when predetermined quantities of data are stored by the virtual machine, periods of high data storage rates of the virtual machine, and periods of low data storage rates of the virtual machine.

5. The method of claim 4, wherein the prediction-based backup generation rule specifies that the second set of backups of the virtual machine is generated at predetermined points in time.

6. The method of claim 5, wherein the first set of backups of the virtual machine is not generated at predetermined points in time.

7. A non-transitory computer readable medium comprising computer readable program code, which when executed by a computer processor enables the computer processor to perform a method for hosting virtual machines, the method comprising:

obtaining a dynamic backup generation rule for the virtual machines, wherein the dynamic backup generation rule specifies that a backup for a virtual machine is to be generated in response to an event, wherein the event is one selected from a group consisting of a certain amount of data has been stored by the virtual machine and a predetermined quantity of time has passed since a last time the virtual machine was backed up;

during a predetermined period of time after obtaining the dynamic backup generation rule:

generating a first set of backups of the virtual machine based on the dynamic backup generation rule; and obtaining virtual machine data change rate information for the virtual machine, sending the virtual machine data change rate information to a remote agent, wherein a duration of the predetermined period of time is set such that a sufficient amount of virtual machine data change rate information may be collected in order to generate a prediction-based backup generation rule;

after the predetermined period of time, obtaining, from the remote agent, the prediction-based backup generation rule wherein the prediction-based backup generation rule is based on the virtual machine data change rate information that was obtained by the production host over the predetermined period of time, wherein the dynamic backup generation rule is not used to back up the virtual machine after the predetermined period of time; and generating a second set of backups of the virtual machine based on the prediction-based backup generation rule, wherein the prediction-based backup generation rule is generated based on an analysis of the virtual machine data change rate information by the remote agent, and wherein the analysis determines when predetermined quantities of data are stored by the virtual machine, periods of high data storage rates of the virtual machine, and periods of low data storage rates of the virtual machine.

8. The non-transitory computer readable medium of claim 7, wherein the prediction-based backup generation rule specifies that the second set of backups of the virtual machine is generated at predetermined points in time.

9. The non-transitory computer readable medium of claim 8, wherein the first set of backups of the virtual machine is not generated at predetermined points in time.

* * * * *